US012687846B2

(12) United States Patent
Santillo et al.

(10) Patent No.: US 12,687,846 B2
(45) Date of Patent: Jul. 21, 2026

(54) VEHICLE DISTRIBUTION OF LOW-SPEED AUTONOMOUS VEHICLES

(71) Applicant: Ford Global Technologies, LLC, Dearborn, MI (US)

(72) Inventors: Mario Anthony Santillo, Canton, MI (US); Meghna Menon, Ann Arbor, MI (US); Gregory P. Linkowski, Dearborn, MI (US); Smruti Panigrahi, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 18/456,679

(22) Filed: Aug. 28, 2023

(65) Prior Publication Data

US 2025/0076873 A1 Mar. 6, 2025

(51) Int. Cl.
*G05D 1/00* (2024.01)
*G08G 1/01* (2006.01)
*G08G 1/0967* (2006.01)

(52) U.S. Cl.
CPC ......... *G05D 1/0027* (2013.01); *G08G 1/0116* (2013.01); *G08G 1/096725* (2013.01)

(58) Field of Classification Search
CPC .............. G05D 1/0027; G08G 1/0116; G08G 1/096725
See application file for complete search history.

(56) References Cited

U.S. PATENT DOCUMENTS

| | | | |
|---|---|---|---|
| 9,746,550 B2 | 8/2017 | Nath et al. | |
| 10,369,988 B2 | 8/2019 | Tseng et al. | |
| 10,723,370 B1 * | 7/2020 | Heaton ................... | B61D 15/00 |
| 10,994,709 B2 | 5/2021 | Nemeth et al. | |
| 2019/0064809 A1 * | 2/2019 | Salter ................... | G05D 1/0285 |
| 2021/0155230 A1 * | 5/2021 | Brown ................ | B61L 15/0072 |
| 2022/0164866 A1 * | 5/2022 | Hauk ..................... | H04N 5/222 |
| 2023/0332906 A1 * | 10/2023 | Shchelkanov ..... | G01C 21/3461 |

* cited by examiner

*Primary Examiner* — Hussein Elchanti
(74) *Attorney, Agent, or Firm* — Burris Law, PLLC

(57) ABSTRACT

A method for vehicle distribution of a fleet of vehicles includes: receiving signals from a set of infrastructure sensors; receiving signals from one or more sensors on-board the vehicles; processing the signals from the set of infrastructure sensors and the signals from the one or more sensors on-board the vehicles; controlling autonomous queuing of the vehicles using the processed signals; and controlling autonomous loading and unloading of the vehicles onto a transportation vehicle according to the queuing of the vehicles.

20 Claims, 4 Drawing Sheets

VEHICLE DISTRIBUTION OF LOW-SPEED AUTONOMOUS VEHICLES

FIELD

The present disclosure relates to vehicle distribution of a fleet of vehicles. More specifically, the present disclosure relates to vehicle distribution of low-speed autonomous vehicles.

BACKGROUND

The statements in this section merely provide background information related to the present disclosure and may not constitute prior art.

During the manufacturing of vehicles, after the vehicles are assembled, they are placed into a logistics parking lot to be queued and loaded onto trailers or into train containers for transport to the next hub so that they ultimately arrive at the dealer or customer. Typically, vehicles placed into logistics lots wait for loading and unloading from trailers and train cars. The waiting vehicles require a number of human drivers to find the vehicle needing transport from a vast number of vehicles, physically move the vehicle from where it is parked to a queuing station for loading, manually load the vehicle, which sometimes require offloading and rearranging existing loaded vehicles to make room for the most recent vehicle.

Accordingly, the use of human drivers to move a fleet of vehicles can add inefficiency to the logistics of moving the vehicles.

These issues related to the distribution of a fleet of vehicles are addressed by the present disclosure.

SUMMARY

This section provides a general summary of the disclosure and is not a comprehensive disclosure of its full scope or all of its features.

In one form of the present disclosure, a method for vehicle distribution of a fleet of vehicles includes: receiving signals from a set of infrastructure sensors; receiving signals from one or more sensors on-board the vehicles; processing the signals from the set of infrastructure sensors and the signals from the one or more sensors on-board the vehicles; controlling autonomous queuing of the vehicles using the processed signals; and controlling autonomous loading and unloading of the vehicles onto a transportation vehicle according to the queuing of the vehicles.

In variations of this method, which may be implemented individually or in any combination: the transportation vehicle is a trailer; the vehicles are queued to load onto the trailer, loaded onto the trailer, and subsequently unloaded from the trailer; the vehicles are unloaded from a trailer at a train station and then re-queued for loading onto one or more train cars for transport to another train station where the vehicles are unloaded from the one or more train cars; the vehicles are queued to load onto a subsequent trailer, loaded onto the subsequent trailer for transportation to a vehicle dealer, and then unloaded from the subsequent trailer; delivery of the vehicles at the train station is timed to reduce a wait time at the train station before loading the vehicles on the one or more train cars; the combination of the signals from the set of infrastructure sensors and the signals from the one or more sensors on-board the vehicles enable low-speed movement of the vehicles; the method further comprises utilizing a fleet-management system that has knowledge of movement of each vehicle to control the loading and unloading of the vehicles from the transportation vehicle; knowledge of the movement of each vehicle includes a location and a destination of each vehicle; the fleet-management system queues the vehicles based on characteristics of the vehicles; the characteristics of the vehicles include a distance to a destination for each vehicle and anticipated traffic along a transport route; and the transportation vehicle is one or more train cars.

In another form, a method for vehicle distribution of a fleet of vehicles includes: identifying vehicles within a parking lot to be loaded onto a transportation vehicle; determining current locations of the identified vehicles within the parking lot; coordinating autonomous movement of the vehicles from the current locations to a loading location within the parking lot using signals received from one or more infrastructure sensors and one or more on-board vehicle sensors, wherein the plurality of vehicles are positioned in a queue order at the loading location; and controlling autonomous loading of the plurality of vehicles onto the transportation vehicle using signals received from the one or more infrastructure sensors and the one or more on-board vehicle sensors, and according to the queue order.

In variations of this method, which may be implemented individually or in any combination: the transportation vehicle is a trailer; the vehicles are unloaded from the trailer at a train station and then re-queued for loading onto one or more train cars for transport to another train station where the vehicles are unloaded from the one or more train cars; the transportation vehicle is one or more train cars; the combination of the signals from the one or more infrastructure sensors and the signals from the one or more sensors on-board the vehicles enable low-speed movement of the vehicles; and the method further comprises utilizing a fleet-management system that has knowledge of movement of each vehicle to control loading and unloading of the vehicles from the transportation vehicle.

In another form, a system for vehicle distribution of a fleet of vehicles, includes an infrastructure server with a set of infrastructure sensors, one or more sensors on-board the vehicles, and a fleet management system that processes signals from the set of infrastructure sensors and the signals from the one or more sensors on-board the vehicles to control autonomous queuing of the vehicles using the processed signals and to control loading and unloading of the vehicles onto a transportation vehicle according to the queuing of the vehicles.

In a variation of this system, the vehicles are queued to load onto a trailer, loaded onto the trailer, and subsequently unloaded from the trailer.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
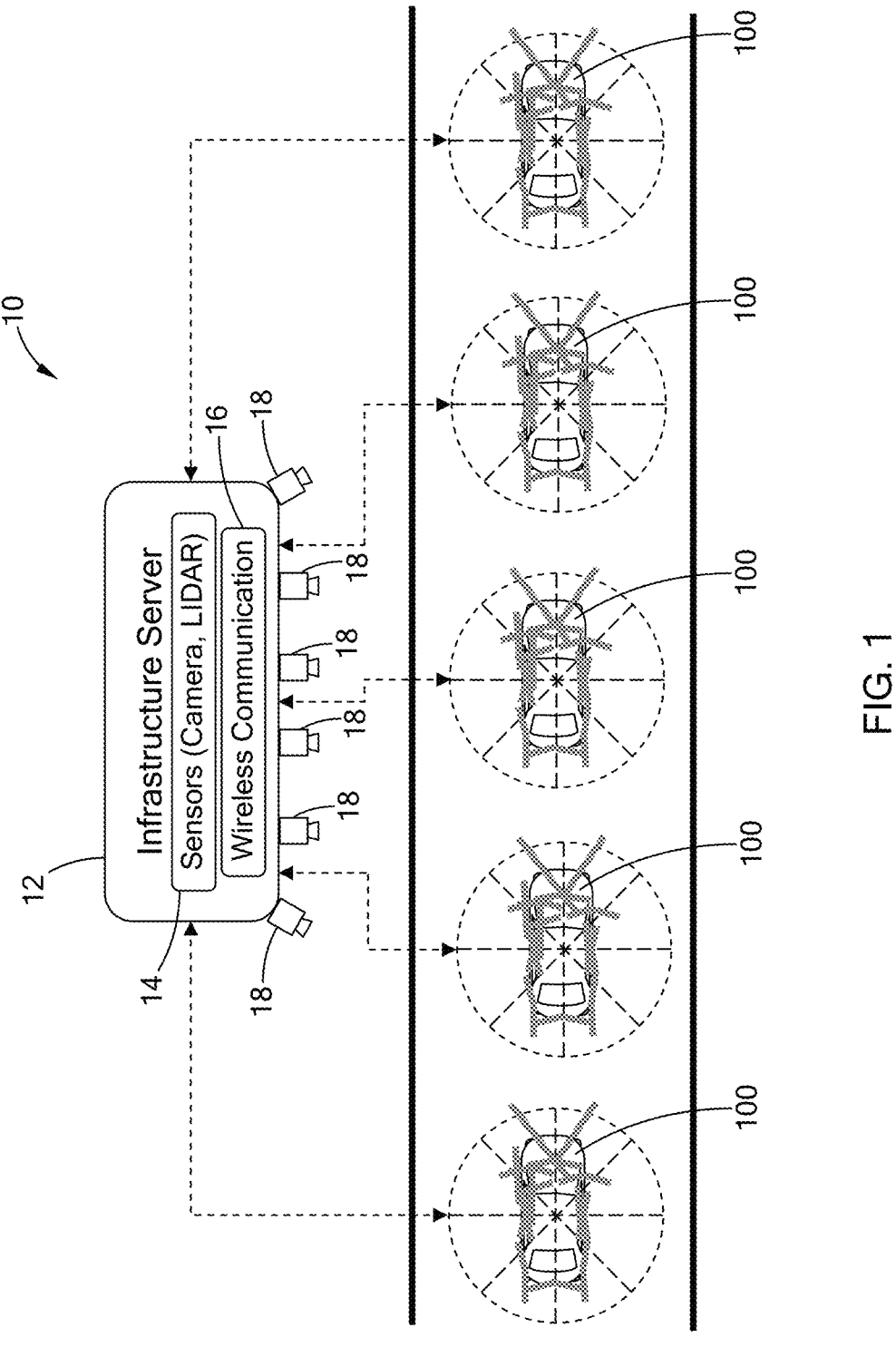
FIG. 1 illustrates a system for distribution of a fleet of vehicles in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure describes a system and method to distribute low-speed, that is, moving slowly, autonomous and semi-autonomous vehicles using a combination of infrastructure (IX) and vehicle sensors such as, for example, cameras, lidar, radar, ultrasonic devices, to enable low-speed autonomous or semi-autonomous movement of the vehicles without a driver. This system is capable for both indoor and outdoor deployment factories. One or more herein described systems provide for the control of the movement of vehicles without the need for drivers by using a wireless centralized fleet-management system to route each vehicle's movement at any particular moment to increase the efficiency to the entire logistics chain.

Referring now to FIG. 1, there is shown a system 10 for the distribution of autonomous and semi-autonomous vehicles 100 for example, situated in a parking lot. The system 10 includes an IX server 12. The IX server 12 further includes a sensor component 14 that communicates with a set of IX sensors 18 such as, for example, one or more of cameras, lidar, radar, and ultrasonic devices. The sensors 18 monitor the movement of the vehicles 100 as they move through, for example, a factory floor or parking lot. The IX server 12 also includes a wireless communication component that provides for communication between the IX server 12 and the vehicles 100.

Figure 2:
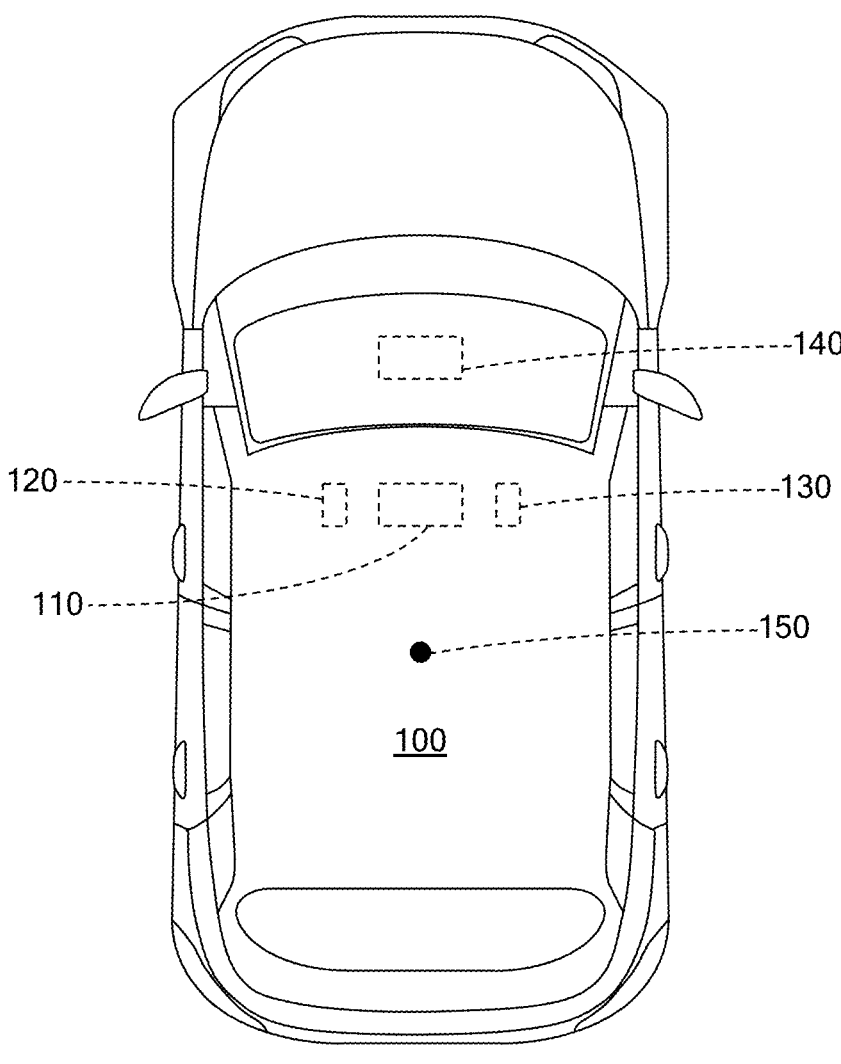
FIG. 2 Illustrates an example vehicle distributed by the system shown in FIG. 1 in accordance with the principles of the present disclosure.

Referring further to FIG. 2, in various forms, the vehicles 100 may be powered in a variety of known ways, for example, with an electric motor and/or internal combustion engine. The vehicles 100 may be a land vehicle such as a car, truck, etc., and/or a robot such as drone. The vehicles 100 include a controller 110, one or more actuators 120, a plurality of on-board sensors 130, and a human machine interface (HMI) 140. The vehicles 100 have a reference point 150, that is, a specified point within the space defined by a vehicle body, for example, a geometrical center point at which respective longitudinal and lateral center axes of the vehicle 100 intersect. The reference point 150 identifies the location of the vehicles, for example, a loading location for the vehicles 100 to be loaded onto a transportation vehicle.

The controller 110 operates the vehicles 100 in an autonomous or a semi-autonomous mode. For purposes of this disclosure, an autonomous mode is defined as one in which each of the vehicles 100 propulsion, braking, and steering are controlled by the controller 110: in a semi-autonomous mode the controller 110 controls one or two of vehicles 100 propulsion, braking, and/or steering.

The controller 110 includes programming to operate one or more of land vehicle brakes, propulsion (for example, control of the rate of change of velocity of the vehicle by controlling one or more of an internal combustion engine, electric motor, hybrid engine, etc.), steering, climate control, interior and/or exterior lights, etc., as well as to determine whether and when the controller 110, as opposed to a human operator, is to control such operations. Additionally, the controller 110 is programmed to determine whether and when a human operator is to control such operations.

The controller 110 includes or may be communicatively coupled to (for example, via a vehicle communications bus as described further below) more than one processor, for example, controllers or the like included in the vehicles 100 for monitoring and/or controlling various vehicle controllers, for example, a powertrain controller, a brake controller, a steering controller, etc. The controller 110 is generally arranged for communications on a vehicle communication network that can include a bus in the vehicle such as a controller area network (CAN) or the like, and/or other wired and/or wireless mechanisms.

Via a vehicle network, the controller 110 transmits messages to various devices in the vehicles and/or receive messages from the various devices, for example, an actuator 120, an HMI 140, etc. Alternatively, or additionally, in cases where the controller 110 includes multiple devices, the vehicle communication network is utilized for communications between devices represented as the controller 110 in this disclosure. Further, as mentioned below, various other controllers and/or sensors provide data to the controller 110 via the vehicle communication network.

In addition, the controller 110 is configured for communicating through a wireless vehicular communication interface with other traffic objects (for example, vehicles, IX, pedestrian, etc.), for example, via a vehicle-to-vehicle communication network and/or a vehicle-to-IX communication network, such as communicating with the wireless communication component 16 of the IX server 12. The vehicular communication network represents one or more mechanisms by which the controller 110 of the vehicles 100 communicate with other traffic objects, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Examples of vehicular communication networks include cellular, Bluetooth®, IEEE 802.11, dedicated short range communications (DSRC), and/or wide area networks (WAN), including the Internet, providing data communication services.

The vehicle actuators 120 are implemented via circuits, chips, or other electronic and or mechanical components that can actuate various vehicle subsystems in accordance with appropriate control signals. The actuators 120 may be used to control braking, velocity, rate of change of velocity, torque and steering of the vehicles 100. The controller 110 can be programmed to actuate the vehicle actuators 120 including propulsion, steering, and/or braking based on the planned rate of change of velocity.

The sensors 130 include a variety of devices to provide data to the controller 110. For example, the sensors 130 may include object detection sensors such as lidar sensor(s) disposed on or in the vehicles 100 that provide relative locations, sizes, and shapes of one or more targets surrounding the vehicles 100, for example, second vehicles, bicycles, pedestrians, robots, drones, etc., travelling next to, ahead, or behind of the vehicle. As another example, one or more of the sensors can be radar sensors fixed to vehicles bumpers may provide locations of the target(s) relative to the location of each of the vehicles 100.

The object detection sensors may include a camera sensor, for example, to provide a front view, side view, etc., providing images from an area surrounding the vehicles 100. For example, the controller 110 may be programmed to receive image data from a camera sensor(s) and to implement image processing techniques to detect a road, IX elements, etc. The controller 110 may be further programmed to determine a current vehicle location based on location coordinates, for example, OPS coordinates, received from the vehicle's 100 location from a GPS sensor.

The HMI 140 is configured to receive information from a user, such as a human operator, during operation of the vehicles 100. Moreover, the HMI 140 is configured to present information to the user, such as, an occupant of one or more of the vehicles 100. In some variations, the controller 110 is programmed to receive destination data, for example, location coordinates, from the HMI 140.

Accordingly, the vehicles 100 destined for a particular trailer can be autonomously moved to that trailer using a combination of IX and vehicle and/or trailer sensors. Routing can be done using vehicle location, distance to travel, queue in line for trailer loading, trailer readiness for loading, etc. Vehicles 100 requiring additional charge/fuel can be prepped ahead according to the final queue. Other vehicles 100 destined for other trailers operate in the same way, so that movement of an entire fleet can be coordinated. The entire fleet coordinates through a central fleet-management system directs all traffic and logistics from an assembly plant to the fleet dispatcher application in a pre-sorted order.

Once the vehicles 100 arrive at a specified transportation vehicle such as a trailer for loading, the vehicles 100 coordinate with the trailer to load in a specified manner, using a combination of IX sensors 18 and vehicle and trailer sensors to drive onto the trailer using a series of interlocks to ensure the trailer is in the correct orientation to accept each of the vehicles 100 in order. Automatic interlocks between trailer and vehicle fleet manager prevent loading the vehicles 100 if the trailer is not ready (for example, the ramps are not positioned correctly to accept vehicles driving onto trailer). Manual Interlocks (for example, start/stop) give the trailer loader ultimate control to control the process. In. some variations, a driver secures the vehicles 100 as they come to a stop and the other vehicles 100 begin to load, saving time. The same process is utilized for driving the vehicles 100 onto a train car. Further, the same automated process is utilized for unloading vehicles from a trailer or train car. The system 10 is geofenced to load/unload the vehicles 100 at a particular facility, so that no automatic operation is allowed outside of those specific areas. This helps prevent theft, as vehicles could be rendered inoperable while in transportation outside of the geofence. In certain variations, a manual backup setting is utilized to allow load/unload of vehicles based on unforeseen circumstances.

In the distribution of the vehicles 100, after the trailer is loaded, it is driven to the train station for the next stage of vehicle transport. At the station, the vehicles 100 are autonomously unloaded from the trailer, using the reverse process from loading, and the vehicles 100 are again re-queued (along with vehicles from other trailers) for proper assignment when loading onto the train cars. Multiple types of vehicles can be loaded onto train cars for regional transportation. In a direct-load scenario, the vehicles 100 are autonomously unloaded from the trailer and immediately loaded onto the train car in the same sorted order. Additionally, the delivery can be timed exactly to reduce wait time at the station and increase delivery efficiency (for example, lack of parking), all managed by a cloud-based fleet-management application. In this manner, vehicles are not touched by a human after the assembly process all the way to the dealership, which reduces the possibility of dents, dings, scratches, interior soiling, etc.

The centralized fleet-management application has complete knowledge of the vehicles 100 in its control (for example, current location, destination, special notes, etc.), which adds accountability and traceability to the distribution process. The fleet-management is coordinated both within and across sites to optimize delivery timing of each vehicle 100 riding on each trailer or train car. A number of logistics applications can be used here, which may involve a combination of an IX sensing system integrated with a traffic-management algorithm to queue and deconflict vehicles in real-time. Accordingly, the fleet-management application queues vehicles 100 based on their unique characteristics (how far does it need to travel, what traffic is along the route, when does it need to get there to line up in the correct order, etc.). In some variations, the vehicles 100 are loaded directly onto one or more train cars.

Figure 3A:
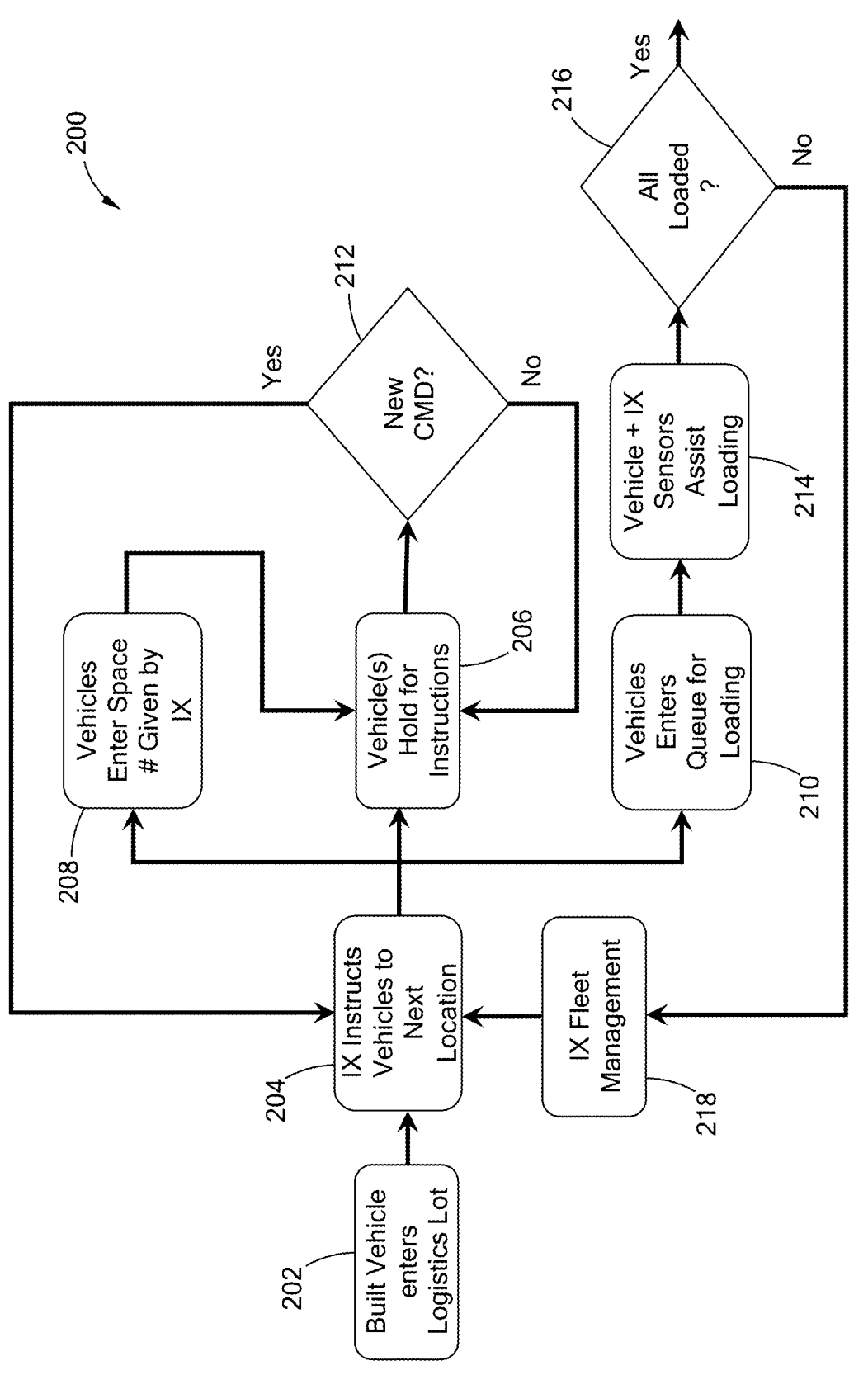
FIG. 3A is a flow diagram of controlling the distribution of vehicles with the system show in FIG. 1 in accordance with the principles of the present disclosure.
Figure 3B:
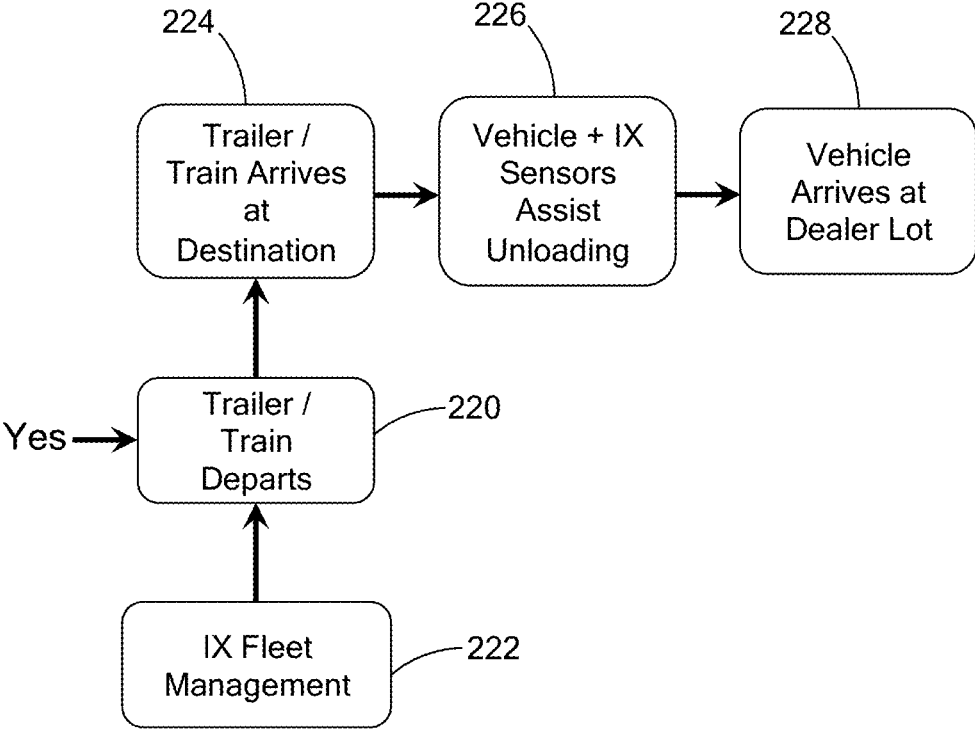
FIG. 3B is continuation of the flow diagram of FIG. 3A in accordance with the principles of the present disclosure.

Referring now to FIGS. 3A and 3B, there is shown a flow diagram 200 for the distribution of a fleet of vehicles 100 with the system 10. The vehicles 100 enter a logistics lot at a step 202. In a step 204, the IX server 12 instructs the vehicles 100 to their next location while receiving instructions from an IX fleet management application 218 that queues the vehicles 100 based on characteristics of the vehicles, such as, for example, anticipated traffic and transport route. Next, the vehicles 100 hold for instructions at a step 206 while the vehicles 100 enter a space number provided from the IX server 12 from a step 208. Or the vehicles 100 enter a queue for loading at a step 210.

If the vehicles 100 are being held for instructions, a decision step 212 determines if there are new commands from the vehicles 100. If the answer is yes, the process 200 returns to the step 204 for further location instructions. If the answer is no, the process 200 returns to the step 206 so that the vehicles 100 are held for additions instructions.

If the vehicles enter a queue for loading at the step 210, the process 200 proceeds to a step 214 where the IX sensors 18 and the vehicle sensors 130 assist the loading of the vehicles 100 on the trailer on train car. Next, the process 200 proceeds to a decision step 216 to determine if all the vehicles 100 are loaded onto the trailer or train car(s). If the answer is no, the process 200 returns to the IX fleet management application 218. If the answer is yes, the process 200 proceeds to a step 220 where the trailer or train departs while the IX fleet management application at a step 222 provides instructions and monitors the movement of the vehicles 100.

Next, in a step 224, the trailer or train arrives at a predetermined location. The process 200 then proceeds to a step 226 where the IX sensors 18 and the vehicle sensors 130 assist the unloading of the vehicles 100 from the trailer or train car. The vehicle(s) 100 arrive at a vehicle dealer lot in a step 228. In certain variations, the process 200 provides for the loading of the vehicles directly onto train cars rather than utilizing a trailer as an intermediary transportation vehicle.

Among other advantages and benefits, the system and method described in the present disclosure minimize the amount of human-touches of newly assembled factory vehicles, have the ability to move an entire fleet of vehicles with limited use of human drives, and offers increased flexibility and efficiency in the logistics transport chain.

Further, the combination of IX and vehicle sensing adds robustness to the distribution of vehicles in different weather conditions and variable lighting and provides additional security to allow vehicles to be loaded/unloaded within a geofenced facility. Further advantages and benefits include real-time knowledge of vehicle location, sorted order for automatic loading and unloading, and just-in-time loading to optimize the routing of the vehicles, Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for vehicle distribution of a fleet of vehicles, the method comprising:

receiving signals from a set of infrastructure sensors arranged outside a transportation vehicle;

receiving signals from one or more sensors on-board the vehicles;

processing the signals from the set of infrastructure sensors and the signals from the one or more sensors on-board the vehicles;

controlling autonomous queuing of the vehicles using the processed signals; and controlling autonomous loading and unloading of the vehicles onto the transportation vehicle according to the autonomous queuing of the vehicles by using a combination of the processed signals from the set of infrastructure sensors and the signals from the one or more sensors on-board the vehicles.

2. The method of claim 1, wherein the transportation vehicle is a trailer.

3. The method of claim 2, wherein the vehicles are queued to load onto the trailer, loaded onto the trailer, and subsequently unloaded from the trailer.

4. The method of claim 1, wherein the vehicles are unloaded from a trailer at a train station and then re-queued for loading onto one or more train cars for transport to another train station where the vehicles are unloaded from the one or more train cars.

5. The method of claim 4, wherein the vehicles are queued to load onto a subsequent trailer, loaded onto the subsequent trailer for transportation to a vehicle dealer, and then unloaded from the subsequent trailer.

6. The method of claim 4, wherein delivery of the vehicles at the train station is timed to reduce a wait time at the train station before loading the vehicles on the one or more train cars.

7. The method of claim 1, wherein the combination of the processed signals from the set of infrastructure sensors and the signals from the one or more sensors on-board the vehicles enables autonomous movement of the vehicles.

8. The method of claim 1, further comprising utilizing a fleet-management system that has knowledge of a movement of each vehicle to control the autonomous loading and unloading of the vehicles from the transportation vehicle.

9. The method of claim 8, wherein knowledge of the movement of each vehicle includes a location and a destination of each vehicle.

10. The method of claim 8, wherein the fleet-management system queues the vehicles based on characteristics of the vehicles.

11. The method of claim 10, wherein the characteristics of the vehicles include a distance to a destination for each vehicle and anticipated traffic along a transport route.

12. The method of claim 1, wherein the transportation vehicle is one or more train cars.

13. A method for vehicle distribution of a fleet of vehicles, the method comprising:

identifying vehicles within a parking lot to be loaded onto a transportation vehicle;

determining current locations of the identified vehicles within the parking lot;

coordinating autonomous movement of the vehicles from the current locations to a loading location within the parking lot using signals received from one or more infrastructure sensors arranged outside a transportation vehicle and one or more on-board vehicle sensors, wherein the fleet of vehicles are positioned in a queue order at the loading location; and controlling autonomous loading of the fleet of vehicles onto the transportation vehicle using a combination of signals received from the one or more infrastructure sensors and the one or more on-board vehicle sensors, and according to the queue order.

14. The method of claim 13, wherein the transportation vehicle is a trailer.

15. The method of claim 14, wherein the vehicles are unloaded from the trailer at a train station and then re-queued for loading onto one or more train cars for transport to another train station where the vehicles are unloaded from the one or more train cars.

16. The method of claim 13, wherein the transportation vehicle is one or more train cars.

17. The method of claim 13, wherein the combination of the signals from the one or more infrastructure sensors and the signals from the one or more on-board vehicle sensors enable the autonomous movement of the vehicles.

18. The method of claim 13, further comprising utilizing a fleet-management system that has knowledge of a movement of each vehicle to control loading and unloading of the vehicles from the transportation vehicle.

19. A system for vehicle distribution of a fleet of vehicles, the system comprising:

an infrastructure server with a set of infrastructure sensors;

one or more sensors on-board the vehicles; and a fleet management system that processes signals from a combination of the set of infrastructure sensors and the signals from the one or more sensors on-board the vehicles to control autonomous queuing of the vehicles using the processed signals and to control loading and unloading of the vehicles onto a transportation vehicle according to the autonomous queuing of the vehicles, wherein the set of infrastructure sensors is arranged outside the transportation vehicle.

20. The system of claim 19, wherein the vehicles are queued to load onto a trailer, loaded onto the trailer, and subsequently unloaded from the trailer.

* * * * *